United States Patent
Kimmel

[19]

[11] Patent Number: 5,956,754
[45] Date of Patent: Sep. 21, 1999

[54] DYNAMIC SHARED USER-MODE MAPPING OF SHARED MEMORY

[75] Inventor: Jeffrey S. Kimmel, Chapel Hill, N.C.

[73] Assignee: Data General Corporation, Westboro, Mass.

[21] Appl. No.: 08/796,651

[22] Filed: Mar. 3, 1997

[51] Int. Cl.⁶ .................................................. G06F 12/10
[52] U.S. Cl. ...................................... 711/206; 711/207
[58] Field of Search ............................... 395/406; 711/3, 711/206, 121

[56] References Cited

U.S. PATENT DOCUMENTS

| | | |
|---|---|---|
| 3,902,163 | 8/1975 | Amdahl . |
| 4,047,243 | 9/1977 | Dijkstra . |
| 4,388,685 | 6/1983 | Kotok . |
| 4,410,941 | 10/1983 | Barrow . |
| 4,442,487 | 4/1984 | Fletcher . |
| 4,669,043 | 5/1987 | Kaplinsky ................................. 711/3 |
| 4,713,755 | 12/1987 | Worley, Jr. . |
| 4,733,348 | 3/1988 | Hiraoka . |
| 4,774,653 | 9/1988 | James . |
| 5,109,335 | 4/1992 | Watanabe . |
| 5,155,834 | 10/1992 | Ryan . |
| 5,297,269 | 3/1994 | Donaldson . |
| 5,381,537 | 1/1995 | Baum . |
| 5,437,016 | 7/1995 | Ikegaya . |
| 5,493,660 | 2/1996 | DeLano . |
| 5,524,212 | 6/1996 | Somani et al. .......................... 711/121 |
| 5,539,892 | 7/1996 | Reininger . |

*Primary Examiner*—Tod R. Swann
*Assistant Examiner*—David Langjahr
*Attorney, Agent, or Firm*—Donald A. Lewine

[57] ABSTRACT

A method for use in a multiprocessor computer system where data objects larger than the address space of a single task are mapped in main memory and the translation lookaside buffer (TLB) is maintained by user mode software is disclosed. The method uses lazy TLB updating that allows stale data to stay in the TLB until it needs to be purged.

9 Claims, 11 Drawing Sheets

Dynamically Mapped Shared Memory

Dynamically Mapped Shared Memory

| | |
|---|---|
| Reference Count | 1001 |
| Slot Used Recently Flag | 1002 |
| Pointer to Pointer to Mapped Buffer | 1003 |
| PID | 1004 |
| Slot Sequence Number (SSN) | 1005 |
| Padding | 1006 | dshm_slot

FIG. 4

| | |
|---|---|
| Pointer to next node | 1101 |
| Pointer to slot array | 1102 |
| Slot count | 1103 |
| Array of pointers to struct __dshm_node__ (one entry for each possible CPU) | 1104 |
| Pointer to the map | 1105 |
| Size of the map | 1106 |
| Current slot index | 1107 |
| Pad | 1108 |
| Map serial number (MSN) | 1109 |
| Pad | 1110 |
| Initialized flag | 1111 |

__dshm_node__

FIG. 5

| | |
|---|---|
| Pointer to map serial number | 1201 |
| Attach serial number (ASN) | 1202 |
| PID | 1203 |
| Force unmap flag | 1204 |
| Attach ID | 1205 |
| Buffer size shift | 1206 |
| Slot size shift | 1207 |
| Slot size mask | 1208 |
| Pointer to near __dshm_node__ | 1209 |
| Pointer to last __dshm_node__ | 1210 |
| Pointer to map | 1211 |
| Size of map | 1212 |

__dshm_attach__

FIG. 6

//DYNAMIC SHARED USER-MODE MAPPING OF SHARED MEMORY

CROSS REFERENCE TO RELATED APPLICATIONS

There are no related applications.

BACKGROUND

1. Field of Invention

This invention is generally related to the field of data processing. In particular, it relates to address formation in an information processing system including logical address spaces and directory tables (e.g. a Translation Lookaside Buffer or TLB).

2. Description of Prior Art

The present invention involves the control of Translation Lookaside Buffers (TLBs) by user mode software. It also relates to the use of virtual memory to address a very large data object in a multi-processor computer system.

A good description of a computer system with virtual memory and Translation Lookaside Buffers can be found in U.S. Pat. No. 3,902,163 issued on Aug. 26, 1975 to Gene M. Amdahl, et al. Additional patents showing TLBs are U.S. Pat. Nos. 4,410,941, 5,109,335 and 5,155,834. The latter is notable because it shows a scheme for use in a multi-processor to keep TLB's coherent.

The problem of cache and TLB coherency goes back over 25 years as reflected in U.S. Pat. No. 3,771,137 issued to Robert Paul Barner on Nov. 6, 1973. Other more recent U.S. patents showing different schemes for TLB coherency are U.S. Pat. Nos. 4,442,487, 4,733,348, and 5,333,296. All prior art TLB coherency schemes can be characterized as aggressive. They all try to invalidate stale data ("TLB invalidates") as quickly and efficiently as possible. It would be fair to say that the general trend over the last 25 years has been to make the TLB invalidates happen more quickly with less overhead. The present invention, on the other hand, is not aggressive (is "lazy") about TLB invalidates and allows stale data to sit in the TLBs until user mode software determines that a TLB invalidate is required for correct operation of the application software. In fact, the last 25 years of prior art teach away from the present invention. They work hard to make sure that there is no stale data in the TLB while the present invention allows stale data to stay in the TLB as long as it will do no harm.

Again, the use of software to control cache consistency has been around for decades. U.S. Pat. No. 4,713,755 issued to William S. Worley of Dec. 15, 1987 is one example. U.S. Pat. No. 4,774,653 issued to David V. James on Sep. 27, 1988 shows a hybrid hardware/software method for maintaining a TLB. U.S. Pat. Nos. 5,493,660 and 5,539,892 show different schemes for software assisted TLB maintenance. All of the prior art software assisted TLB maintenance was done by operating system (or Kernel mode) software. In the present invention user-mode code is responsible for determining what TLB entries need to be invalidated, and when, and invokes kernel mode code to perform any invalidations only when required.

Again, addressing large data objects is old. U.S. Pat. No. 4,047,243 issued to Edsger W. Dijkstra on Sep. 6, 1977 shows one such scheme. U.S. Pat. No. 4,388,685 issued to Alan Kotok, et al on Jun. 14, 1983 shows a different scheme for extended virtual addressing. U.S. Pat. No. 4,731,734 issued to Ronald H. Gruner, et al on Mar. 15, 1988 shows, among other things, an object based addressing scheme for dealing with large data objects. More recently, U.S. Pat. No. 5,381,537 issued to Richard L. Baum on Jan. 10, 1995 shows a method for translating a large virtual address into a smaller conventional address as part of a TLB update. Again, all of the TLB updating is done either by hardware or Kernel mode operating system software.

Nothing in the prior art suggests doing any of the TLB maintenance in user mode where user mode software is responsible for the correctness of the TLB and certainly nothing suggests the unique combination of extended addressing, multi-processor support and lazy TLB invalidation of the present invention.

OBJECTS AND ADVANTAGES

It is a first broad objective of the present invention to provide an improved computer system.

It is a second broad objective of the present invention to provide efficient access to large data objects.

It is a another objective of the present invention to allow programs using the Intel x86 instruction set to access substantially all of the available physical memory directly within the user address space. A key objective is to allow this access to happen with minimal operating system intervention.

BRIEF DESCRIPTION OF THE DRAWINGS

FIG. 4 dshm_slot data structure

FIG. 5 _dshm_node_data structure

FIG. 6 _dshm_attach_data structure

SUMMARY

A method for use in a multiprocessor computer system where data objects larger than the address space of a single task are mapped in main memory and the translation lookaside buffer (TLB) is maintained by user mode software is disclosed. The method uses lazy TLB updating that allows stale data to stay in the TLB until it needs to be purged.

The method is for use in a multi-processor system. The system has a plurality of processors each processor having a translation lookaside buffer (TLB) for caching translations between virtual and physical addresses;

Each processor also has a user mode for executing applications and a kernel mode for performing operating system functions. There are a number of user tasks and a data object larger than the address space of at least one of those tasks.

There is also a mapping table having a plurality of slots and shared by at least two user tasks. Each of the slots is in either one of a plurality of mapped states, the unmapped state or the remapping state.

There are a plurality of buffers each buffer being a piece of the large data object and each buffer being capable of being shared by at least two user tasks.

There are a plurality of shared pointers each associated with a piece of the large data object and either null, or non-null and mapped via said mapping table to one of said buffers.

The method for mapping a selected one of the shared pointers to its corresponding shared buffer uses the following steps:

(I) checking to see if the selected shared pointer is null and if it is null performing the following substeps:
  (i) locating an available slot in the mapping table;
  (ii) placing the available slot into the remapping state;
  (iii) invalidating any buffer pointer which is still using the slot;
  (iv) placing the slot into the mapped state;
  (v) invalidating any TLB entries on the executing CPU corresponding to the slot;
  (vi) setting the shared pointer to point to the slot; and
  (vii) returning to the caller of the method.

If the pointer was not null the method continues by:

(II) obtaining a selected one of the slots associated with the shared pointer;

(III) performing substeps (i) to (vii) of step (I) if the slot is in the remapping state;

(IV) determining, completely in user mode, if any TLB entries need to be flushed and returning directly to the caller of the method if no TLB flush is required;

(V) entering kernel mode and flushing the TLB if step (IV) determined that a flush was required. Only TLB entries on the current CPU need to be flushed.

INTRODUCTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Figure 1:
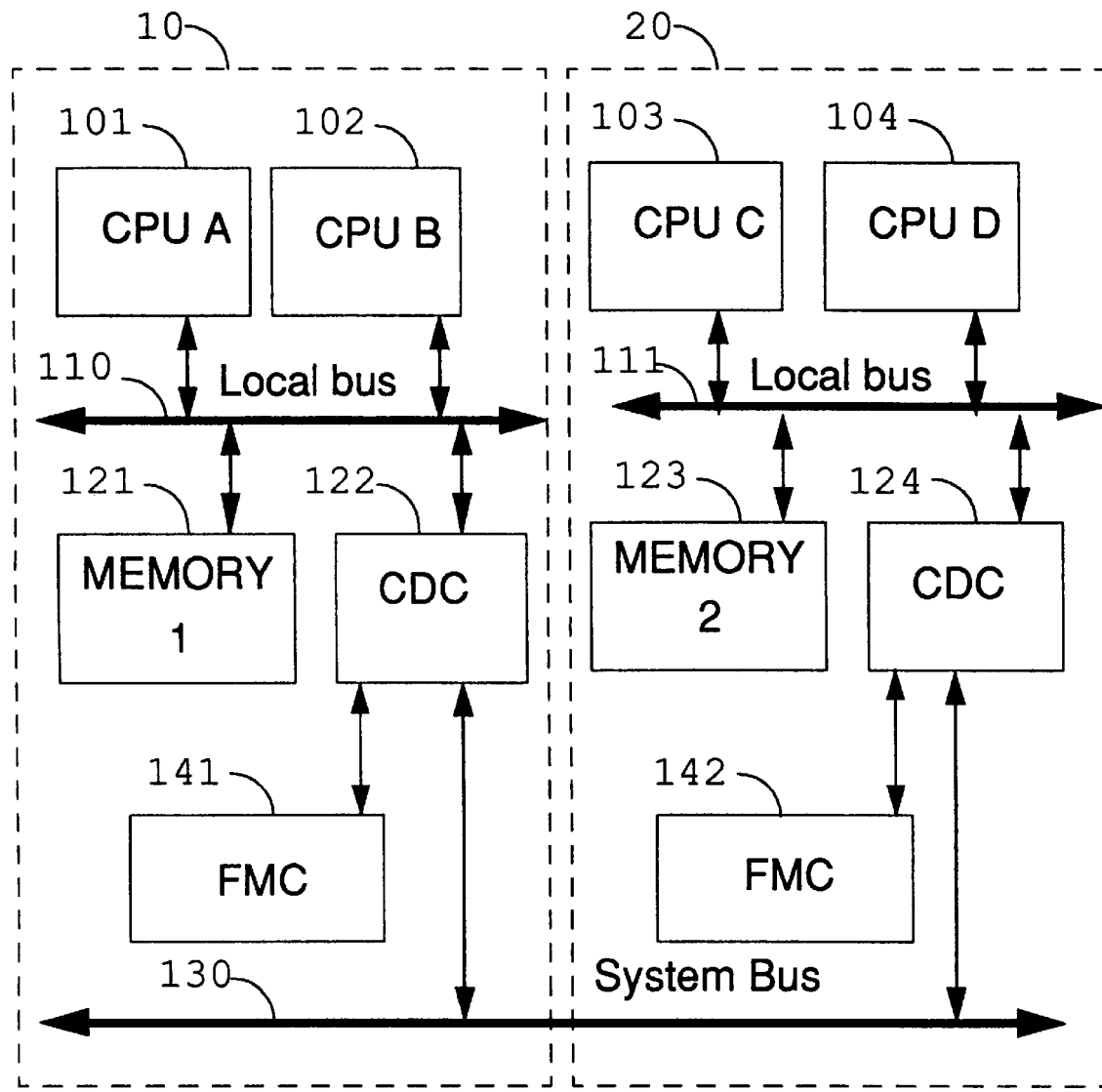
FIG. 1 is a block diagram of a typical multi-processor system.

The invention described here allows single instance (i.e. shared memory based) databases to exploit very large (multi-GByte) main memories on large scale multiprocessors. FIG. 1 shows a typical multiprocessor in a cache coherent Non-Uniform Memory Addressing architecture (ccNUMA). There are multiple CPUs 101, 102, 103, 104 and multiple memories 121, 123. There may be many more CPUs and memories than shown in FIG. 1. Each of memories 121 and 123 may be several gigabytes in size. Each CPU 101, 102, 103, 104 can access any location in memory 121 or memory 123. The Cache Data Controllers 122 and 124 and the Far Memory Cache 141 and 142 are used to keep memory consistent and to accelerate access to data. The exact operation of the hardware is not very important in understanding the present invention. It is merely important to note that there are multiple processors accessing a very large physical memory.

Figure 2:
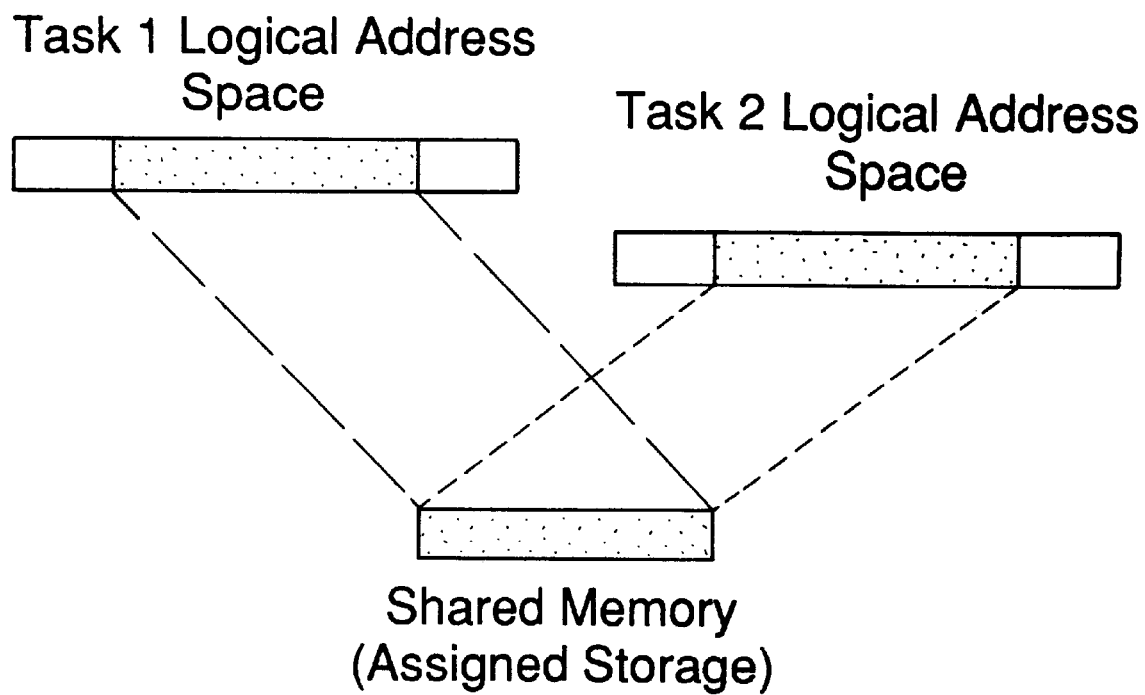
FIG. 2 shows the prior art shared memory scheme

The Intel Pentium Pro processor supports a 36 bit physical address space, enabling the construction of SMP and ccNUMA systems containing up to 64 GBytes of main memory. The ix86 instruction set, however, is limited to 32 bit logical addresses. Unfortunately, many applications for large multiprocessors assume that substantially all of main memory can be accessed directly within the user address space. This is shown in FIG. 2. In particular, the dominant open systems database implementations assume that the processes within each instance of the database share a buffer pool. Without software changes, this buffer pool cannot exceed 4 GBytes (and the practical limit is lower, in the range of 1.5 to 2.8 GBytes). Given systems with ten or more Pentium Pro processors, a number of database workloads would thrash badly in this size pool.

The present invention, known as DSHM allows a single instance database to overcome the ix86 logical addressing barrier. Instead of statically mapping the entire shared buffer pool into its user address space, database processes share a set of dynamically managed mappings (map slots) from the user address space onto the buffer cache. The database still pages directly from disk to its buffer cache. Thus, DSHM adds a level to the address translation model for database buffers, but leaves the database's storage hierarchy unchanged.

Figure 3:
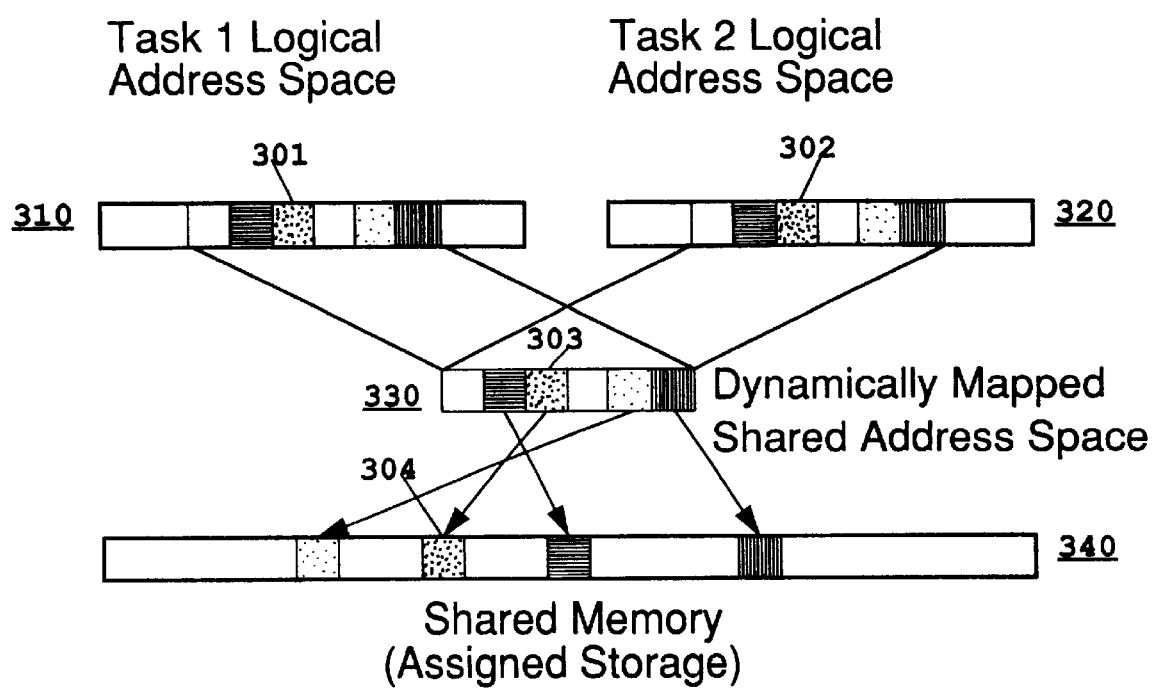
FIG. 3 shows dynamically mapped shared memory
Figure 7:
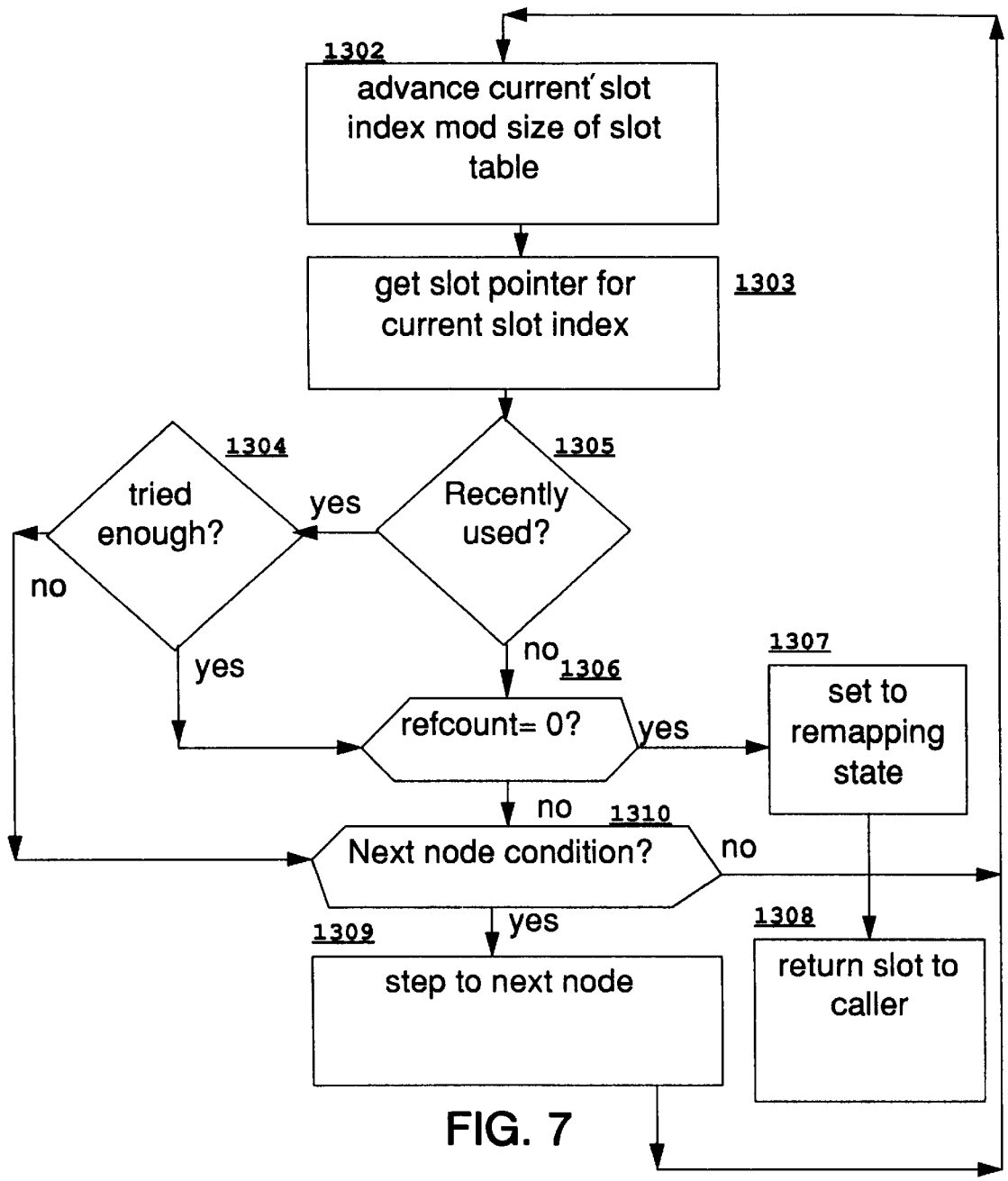
FIG. 7 flow chart for _dshm_get_slot_
Figure 8A:
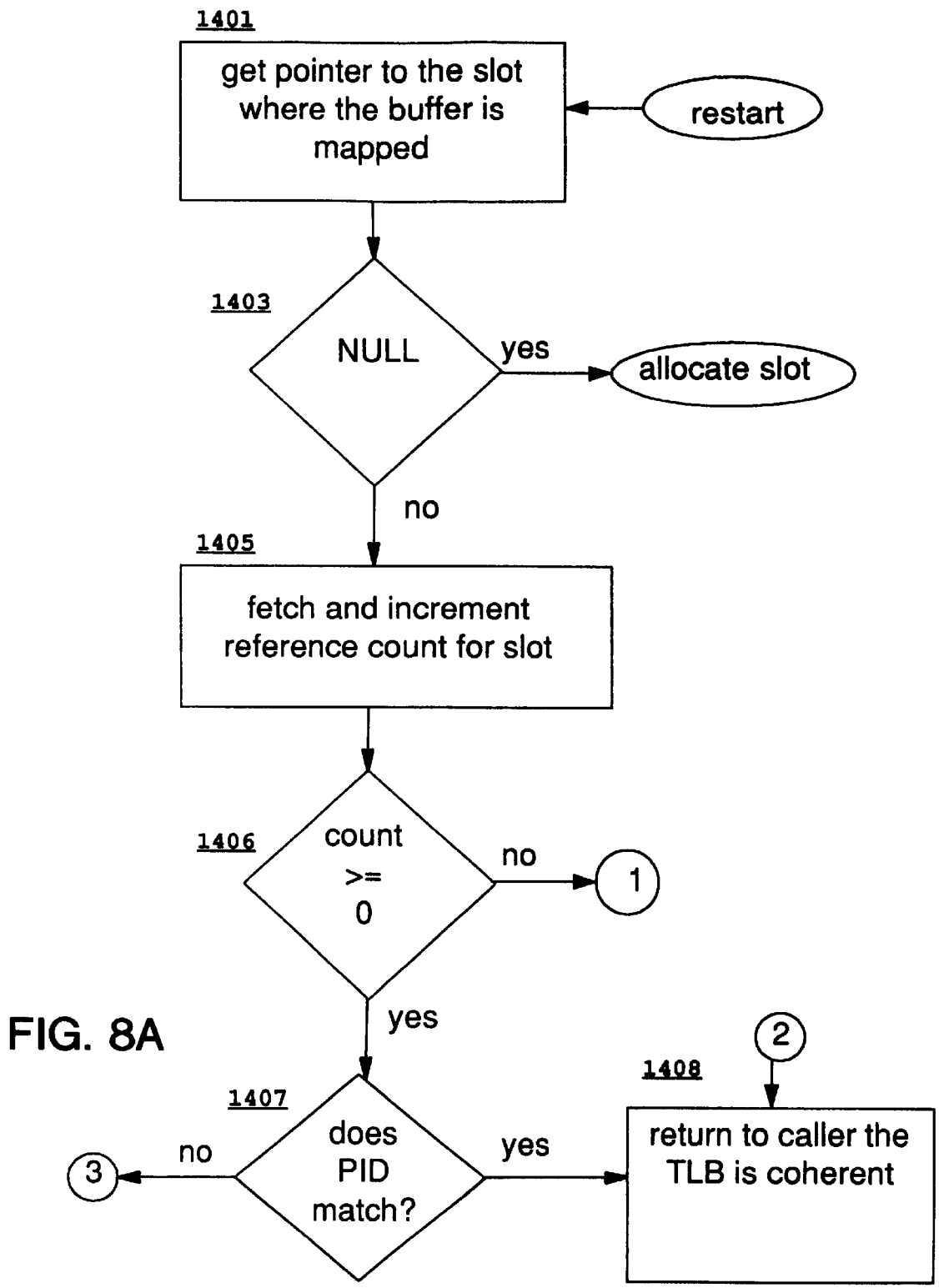
FIG. 8A flow chart for dshm_map startup code
Figure 8B:
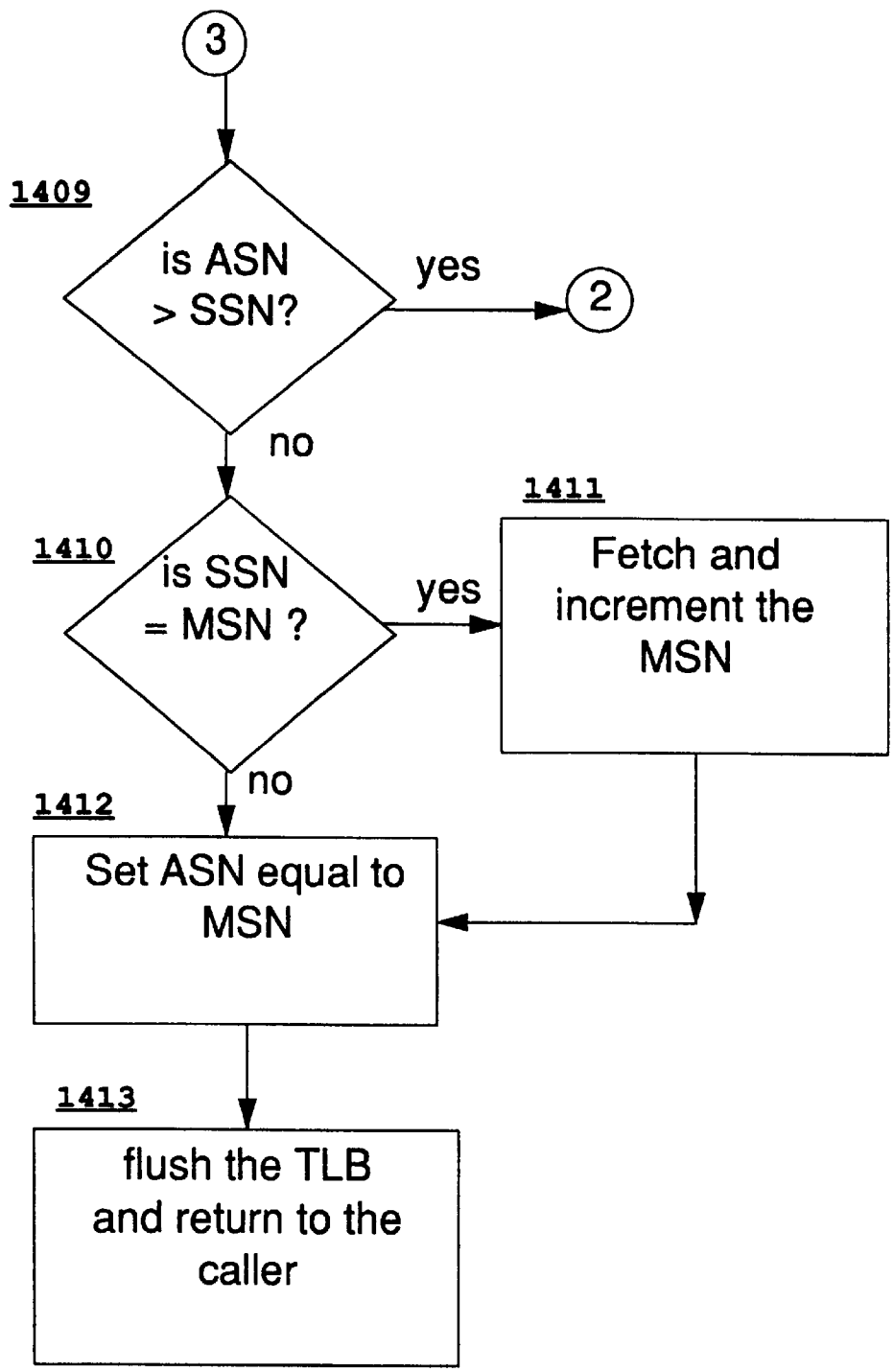
FIG. 8B flow chart for dshm_map sequence number check
Figure 8C:
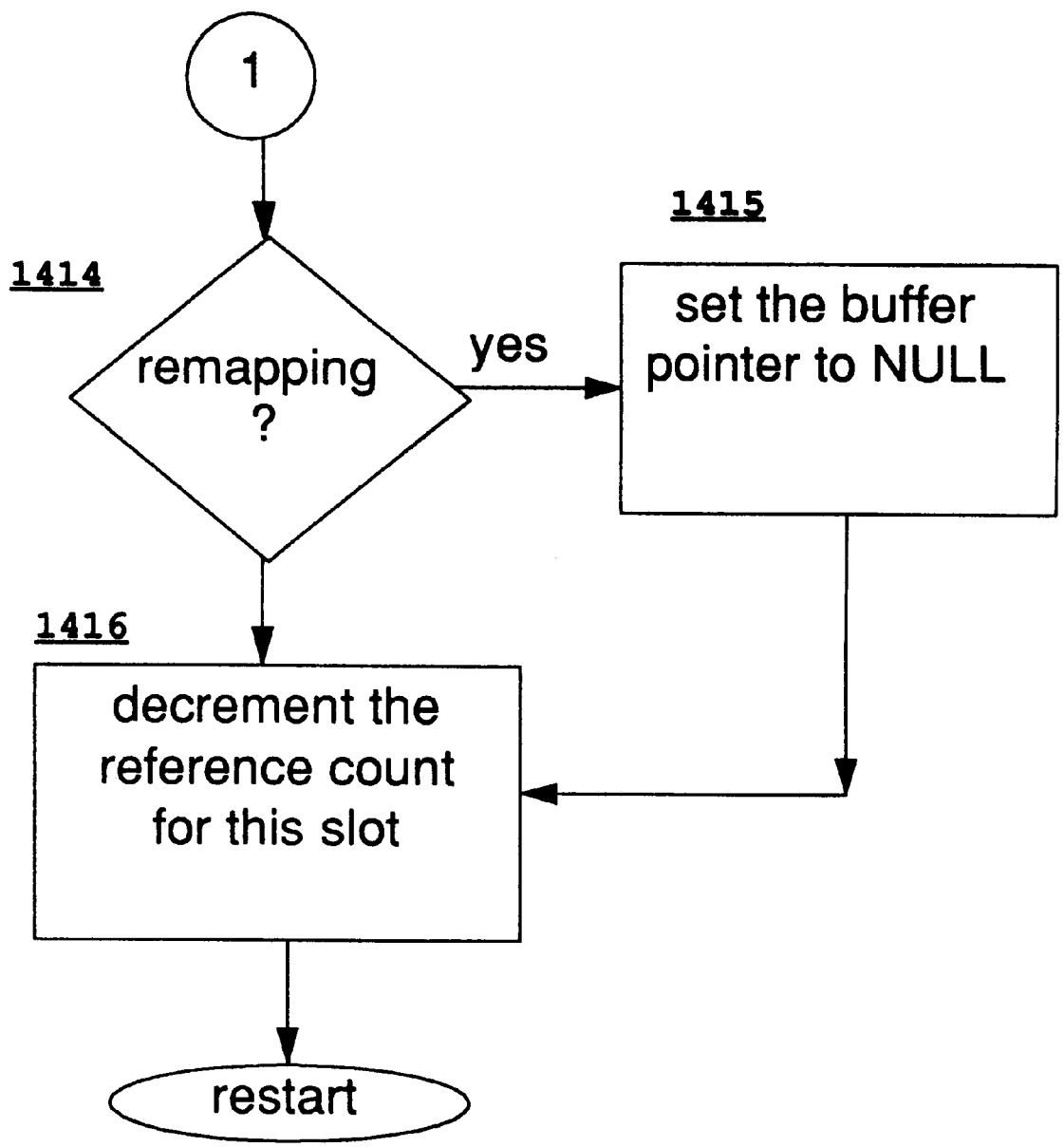
FIG. 8C flow chart for dshm_map use of an existing mapping
Figure 8D:
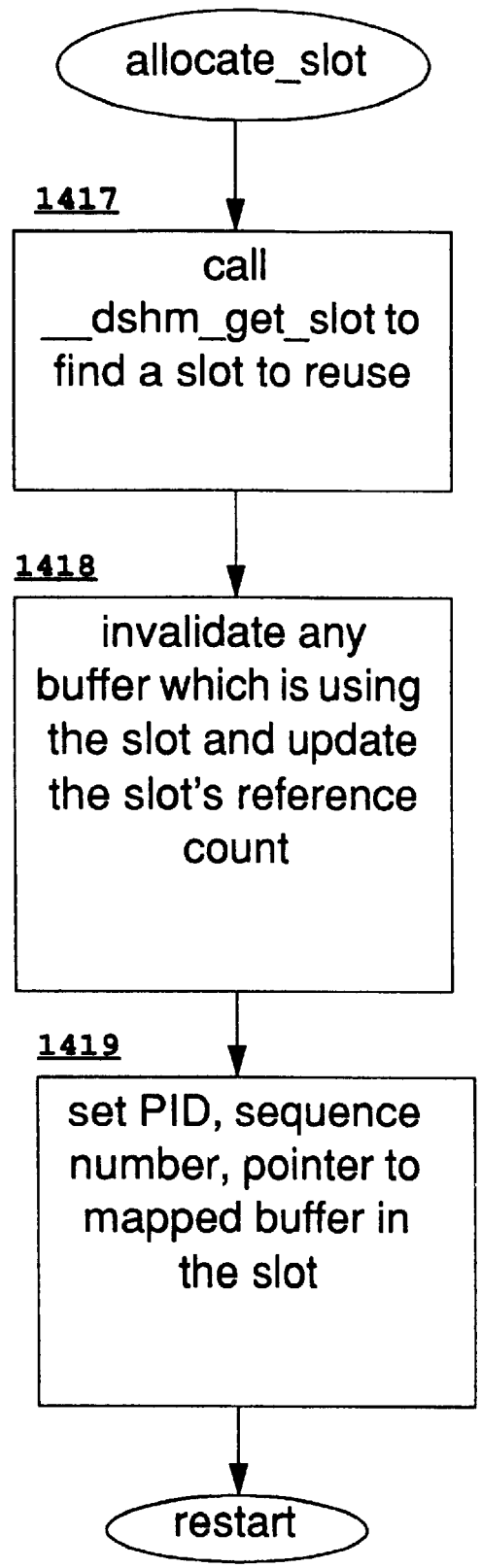
FIG. 8D flow chart for dshm_map allocating a slot

The database buffer pool resides in a shared memory object limited in size only by the available main memory resources. FIG. 3 shows a shared memory object 340. All tasks sharing a DSHM object attach it to the same range of logical addresses. This address range is the DSHM map, a region of shared address space. A user level library manages the assignment of individual map slots to buffers within the DSHM object. The library caches map slot assignments to minimize the overhead associated with dynamic mapping. Any change to a map slot is immediately visible (subject to TLB management) to all tasks which have attached the map. Although the kernel implements this shared address space region, performance needs dictate that the user library manage the coherency of hardware Translation Lookaside Buffers (TLBs) for access to recently-changed map slots.

FIG. 3 shows the dynamically mapped shared memory (DSHM). Task 1 and task 2 each have a logical address space 310 and 320. These are mapped to the shared map slots 330 which allow the tasks to access all of shared memory 340. Each task maps a number of buffers using slots in map 330. For example, Task 1 has a location 301 in its address space that is mapped via map slot 303 to a piece of shared memory 304. Task 2 is also mapping the same piece of shared memory 340 at the same address in its address space at 302. If Task 1 reference a location in 301 the memory reference goes to physical memory 304 in shared object 340. Task 2 can reference the same physical memory using the mapping at 302.

A unique aspect of the present invention is the management of the DSHM map using user mode software without expensive operating system calls.

PREFERRED EMBODIMENT

The preferred embodiment is described below in the computer language known as C code, that implements the invention. Additional comments, data structure diagrams, flow charts and description have been added to aid the reader in understanding the invention. A programmer with ordinary skill in the languages of C and Unix should be able to easily practice the invention from the information presented here.

The following terms are used within this specification:

DSHM Object

A memory object, attached to zero or more user processes, whose contents are accessed using DSHM map slots. The dynamic nature of the map slots allows the object to be larger than the map, limited only by the size of main memory (each DSHM object must be locked in main memory).

Buffer

An individually mappable unit within a DSHM object. All buffers within a DSHM object must be the same size, a power of two.

Buffer Index

The offset (in buffer size units) of a buffer within its DSHM object. The application passes a buffer index to the library to identify which buffer it wishes to use.

Buffer Header

Information used by the application to manage the buffers. The library requires the application to maintain shared buffer headers with storage for the current map slot pointer for each buffer.

DSHM Map

A region of shared address space used to access buffers within a DSHM object. The map is dynamic in that it is made up of map slots which have constant logical addresses but can be mapped to variable offsets within the DSHM object.

Map Slot

A portion of the DSHM map used to access a single buffer within a DSHM object. Each map slot is the larger of the buffer size (a power of two) or the system page size.

DSHM Segment

The combination of a DSHM object and its associated map.

DSHM Library

The user space software which manages the assignment of map slots to buffers within a DSHM object. For performance reasons, these assignments are managed as a cache, and the library also manages TLB coherency for accesses to the DSHM map.

Map Slot Headers

Information used by the library to manage map slots. A map's slot headers live in the DSHM segment itself, as do other shared management data structures for the segment. The library enlarges the object (beyond the size requested by the application) to include space for the segment's shared management data, and sets up permanent mappings of this data within the map.

Map Slot Reference Count

A variable within each map slot header which indicates the number of outstanding references to a given map slot. A map slot cannot be reassigned unless its reference count is zero.

Map Sequence Number (MSN)

A ticket value used to date map slot assignments and process TLB states.

Attach Sequence Number (ASN)

Value of the MSN when a process last flushed its TLB mappings for the map.

Slot Sequence Number (SSN)

Value of the MSN when a slot's buffer assignment was last changed.

Translation Lookaside Buffer (TLB)

A hardware component that caches logical-to-physical address translations. When logical-to-physical translations are changed (by altering page tables), software is responsible for invalidating stale TLB entries. Under DSHM, TLBs are abstracted to be per-process resources whose coherency is managed by the DSHM library. The library calls the kernel to execute the required (supervisor-only) instructions to invalidate TLB entries for selected map slots.

The code blocks presented are:

A. GLOBAL HEADERS

1. /usr/include/dshm.h is the "public" header file which defines the functions and macros required to use the distributed shared memory (DSHM) library. These are the symbols that a programmer uses to access the library functions.

B. LOCAL HEADERS 1. dshm_internals.h defines the macros and data structures used by libdshm.c. The caller of the library functions does not need to access any of these definitions.

2. dshm_asm_internals.c defines some functions which are done directly by Intel Pentium instructions. In an alternate implementation, this header would be replaced by the correct instructions for use on a Motorola PowerPC or a Digital Alpha AXP.

libdshm.c is a file containing the following:

C. INCLUDE FILES

D. INTERNAL FUNCTIONS called only from the DSHM library

1. _dshm_slot_size returns the size of a slot.
2. _dshm_get_slot_ returns a pointer to an available map slot.

E. LIBRARY FUNCTIONS 1. dshm_alignment returns the minimum legal alignment in bytes for a DSHM map.
2. dshm_minmapsize returns the minimum map size required to support a given number of concurrent mappings.
3. dshm_get creates or looks up a shared segment.
4. dshm_attach attaches the designated DSHM segment to the calling process.
5. dshm_reattach is used after a fork () system call to use a map attachment which has been inherited from its parent.
6. dshm_map establishes a mapping to a buffer within a DSHM object. This is the function that performs the extended addressing and lazy TLB flush functions that are the heart of my invention.
7. dshm_unmap releases a mapping to allow map slot reassignment as needed.
8. dshm_detach disconnects the specified segment from the caller's address space.

The code presented here partially implements support for map regions assigned to distinct "nodes" within the system, where each CPU belongs to a node and would preferentially use map slots from the regions assigned to its node. Not every line of code in the accompanying code presentation is pertinent to the present invention.

GLOBAL HEADERS

The dshm.h merely defines a few constants and datatypes and provides the prototypes for all of the functions which make up libdshm.

```
/usr/include/dshm.h
/*
 * DSHM handle typedef and null value.
 */
typedef struct _dshm_attach. *    dshm_handle_t;
#define DSHM_NULL_HANDLE ((dshm_handle_t) -1)
/*
 * Null buffer pointer. DSHM applications must initialize shared
 * buffer pointers to this value before using the buffer pointers
```

-continued

```
* with dshm_map( ).
*/
#define DSHM_NULL          ((const void *) 0)
/*
* Maximum DSHM buffer size in bytes.
*/
#define DSHM_MAX_BUFFER_ 65536
SIZE
/*
* Flag for use in seventh argument to dshm_get( ).
*
* DSHM_FORCE_UNMAP requests DSHM to destroy all unused mappings so that
* they cannot be reused. This mode is useful for debugging application
* problems where one suspects that stale (invalid) buffer pointers are
* being used. When DSHM_FORCE_UNMAP is set, dereferencing a stale
* pointer will typically result in a signal. This behavior contrasts
* with DSHM's default (caching) behavior, where dereferencing a stale
* pointer will typically work (accessing the intended buffer) or
* silently access an unintended buffer.
*/
#define DSHM_FORCE_UNMAP 1
/*
* DSHM function prototypes.
*/
size_t          dshm_alignment(void);
size_t          dshm_minmapsize  (size_t, unsigned long);
int             dshm_get(key_t,    size_t, unsigned long, const void *,
                                   size_t, int, int);
dshm_handle_t dshm_attach(int, int, unsigned long *);
int             dshm_reattach(dshm_handle_t);
int             dshm_map(dshm_handle_t, unsigned long, const void **);
int             dshm_unmap(dshm_handle_t, const void *);
int             dshm_detach(dshm_handle_t);
int             dshm_control(int, int, struct dshmid_ds *);
/* Types and constants relevant to the dynamic shared memory systerm
/* calls.
*/
   /*<--------*/
struct    dshmid_ds
   /*>--------*/
   {
   struct ipc_perm   dshm_perm;
   int               *dshm_amp;
   void              *dshm_maddr;
   size_t            dshm_buffer_size;
   unsigned long     dshm_total_buffer_count;
   unsigned long     dshm_appl_buffer_count;
   size_t            dshm_map_size;
   unsigned long     dshm_nattch;
   pid_t             dshm_lpid;
   pid_t             dshm_cpid;
   time_t            dshm_atime;
   long              dshm_ausec;
   time_t            dshm_dtime;
   long              dshm_dusec;
   time_t            dshm_ctime;
   long              dshm_cusec;
   } ;
/*.Description
/*
/* The dynamic shared memory identifier data structure; one exists
/* for each dynamic shared segment in the system.
/*
/*.Members
/*
/* %decl(" dshm_perm        ")The standard interprocess communication
/*                            access control structure; defines and
/*                            controls access to the shared segment.
/*        *decl(" dshm_amp        ")Pointer to an implementation dependent
/*                                   structure describing address space.
/*                                   (Not interesting to the user).
/*           %decl(" dshm_nattch   ")The number of processes that currently
/*                have attached to the segment via_dshmat_.
/*           %decl(" dshm_lpid     ")  Process id (pid) of the last process to
/*                                   do an attach (dshmat) or detach operation
/*                                   (dshmdt) to the segment.
/*           %decl(" dshm_cpid     ")  Process id (pid) of the process that
/*                                   created the segment via a dshmget
/*                                   operation.
/*           %decl(" dshm_nattch   ")  The number of processes that currently
```

-continued

```
/*                                       have attached to the segment via dshmat.
/*       %decl(" dshm__atime    ")       The time the last attach (dshmat)
/*                                       operation was performed.
/*       %decl(" dshm__ausec    ")       Microseconds extension to shm__atime.
/*       %decl(" dshm__dtime    ")       The time the last detach (dshmdt)
/*                                       operation was performed.
/*       %decl(" dshm__dusec    ")       Microseconds extension to shm__dtime.
/*       %decl(" dshm__ctime    ")       The time this shared memory structure
/*                                       was last changed (by either an IPC__SET
/*                                       or IPC__RMID command to the dshmctl call).
/*       %decl(" dshm__cusec    ")       Microseconds extension to shm__ctime.
/*       The flag bits that the final parameter to the__dshmat__( ) system
/*       call may set
*/
#define DSHM__RDONLY     010000
/*
/* Attach the segment for intent to read only; if this flag is not
/* set, the segment is attached for intent to read and write access.
*/
#define DSHM__R          0400
          /*
           * read permission
           */
#define DSHM__W          0200
          /*
           * write permission
           */
#define DSHM__DEST       004000
          /*
           * Destroy segment when the number attached reaches 0. If this
           * flag is set, an IPC__RMID operation has been done; the segment
           * will be *deleted after all users detach.
           */
```

LOCAL HEADERS dshm__internals.h

The dshm__internals.h header file defines the data structures and constants used by the libdshm functions. There are three data structures defined: dshm__slot shown in FIG. 10; __dshm__node__ shown in FIG. 11; and __dshm__attach__ shown in FIG. 12.

Note that in FIG. 11, the Initialized Flag 1111 is set to the string: "DSHM map has been initialized." when the map is completely setup.

```
#include <limits.h>
#include <sys/types.h>
#define DSHM__MINALIGNMENT__SHIFT     21
#define DSHM__MINALIGNMENT            (1 << DSHM__MINALIGNMENT__SHIFT)
#define DSHM__MINALIGNMENT__MASK      (DSHM__MINALIGNMENT - 1)
#define MAX__DSHM__ATTACHES           (1 << (32 - DSHM__MINALIGNMENT__SHIFT))
#define DSHM__MAX__NODES              128
#define DSHM__MAX__CPUS               512
#define DSHM__MAP__INITIALIZED__STRING ("DSHM map has been initiailzed.")
typedef long           dshm__sn__t;
typedef int            dshm__bool__t;
#define DSHM__FALSE    0
#define DSHM__TRUE     1
struct dshm__slot {
     long              slot__refcnt;
     dshm__bool__t     slot__was__recently__used;
     void **           slot__bufpp;
     pid__t            slot__pid;
     dshm__sn__t       slot__sn;
     char              pad__to__32[12];
     };
#define NOT__RECENTLY__USED__TRIES__PER__NODE      8
#define NOT__IN__USE__TRIES__PER__NODE             1
#define SLOT__INDEX__ADVANCE                       4
#define MAX__REFCNT                 (LONG__MAX / 2)
#define REMAPPING__REFCNT           (LONG__MIN / 2)
struct __dshm__attach__ {
     dshm__sh__t *              attach__msnp;
     dshm__sn__t                attach__sn;
     pid__t                     attach__pid;
     dshm__bool__t attach__force__
     unmap;
     int                        attach__dshmid;
     int                        attach__bufsize__shift;
     int                        attach__slotsize__mask;
```

-continued

```
    int             attach_slotsize_shift;
    struct _dshm_node_ *    attach_near_nodep;
    struct _dshm_node_ *    attach_last_nodep;
    char *          attach_map_addr;
    size_t          attach_map_size;
};
typedef struct _dshm_node_ {
    struct _dshm_node_ *    node_next_nodep;
    struct dshm_slot *      node_slot_array;
    long            node_slot_count;
    struct _dshm_node_ *    node_near_nodep[DSHM_MAX_CPUS];
    char *          node_map_addr;
    size_t          node_map_size;
    dshm_bool_t     node_force_unmap;
    long            node_current_slot_index;
    char            node_current_slot_index_pad[60];
    dshm_sn_t       node_msn;
    char            node_msn_pad[60];
    char            node_map_initialized[64];
} dshm_node_t;
extern struct dshm_slot * _dshm_slot_lockup_[ ];
#define BUFP_TO_SLOTP(handle, bufp) (                               \
        _dshm_slot_lookup_[                                         \
            (((ulong_t)(bufP)) >> DSHM_MINALIGNMENT_SHIFT)] +       \
        ((((ulong_t) (bufp)) & DSHM_MINALIGNMENT_MASK) >>           \
            (handle)->attach_slotsize_shift) )
#define BUFPS_ARE_IN_SAME_SLOT(bufp, slot_bufp, handle)(            \
        ((ulong_t) (bufp)) & (~handle->attach_slotsize_mask)) = =   \
        (((ulong_t) (slot_bufp)) & (~handle->attach_slotsize_mask)) )
#define GET_VALID_SN(map_sn) ((map_sn) - (LONG_MAX / 2))
#define SN_IS_VALID(sn, map_sn) (                                   \
        ((map_sn) - (sn)) >= 0 )
#define SN_IS_NEWER(sn, compare_sn) (                               \
        ((sn) - (compare_sn)) > 0)
#define SN_IS_EQUAL(sn, compare_sn) (                               \
        (sn) = = (compare_sn) )
#define IS_A_POWER_OF_2(value) (                                    \
        (value) != 0 &&                                             \
        ((value) & ~((value) - 1)) = = (value))
#define ROUND_UP_TO_MULTIPLE_OF_POWER_OF_2(value, power_of_2) (     \
        ((value) + (power_of_2) - 1) & ~((power_of_2) - 1) )
``` dshm_asm_internals.c

These macros define single Pentium Pro instruction sequences that are used to manipulate memory. They would not be required except that we have multiple processes on multiple processors accessing the same data structures at about the same time without any locks on the data structures. We use hardware bus locking to make sure that these sequences of instructions are atomic.

It would be possible to implement the claimed invention using a single global interlock on the internal data structures and thus avoiding anything which is specific to a particular type of CPU chip. The preferred mode operates on a Pentium (or compatible) CPU and does not have any coarse grain locking.

The _dshm_log_base_2_ macro is included for performance reasons and does not need to be atomic.

```
#define _dshm_fetch_and_increment_(longp) (                         \
        {                                                           \
            long _reg_ =1;                                          \
            _asm_ _volatile_  ("lock; xaddl %0,%1"                  \
                        : "=r" (_reg_), "=m"   (*(longp))           \
                        : "0" (_reg_) , "1"    (*(longp))           \
                        : "cc");;                                   \
            _reg_;                                                  \
        })
#define _dshm_fetch_and_decrement_(longp) (                         \
        {                                                           \
            long _reg_ = -1;                                        \
            _asm_ _volatile_  ("lock; xaddl %0,%1"                  \
                        : "=r" (_reg_), "=m"(*  \
            (longp))
                        : "0" (_reg_), "l"     (*(longp))           \
                        : "cc");                                    \
            _reg_;                                                  \
        })
#define _dshm_fetch_and_add_(longp, addend) (                       \
        {                                                           \
            long _reg_ = (addend);                                  \
            _asm_ _volatile_   ("lock; xaddl %0,%1"                 \
```

-continued

```
                          : "=r" (_reg_), "=m"  (*(longp))       \
                          : "0" (_reg_), "1"    (*(longp))       \
                          : "cc");                                \
          _reg_;                                                  \
        })
#define __dshm_compare_and_swap_(longp, compare_val, new_val)     \
        {                                                         \
          long _eax_ = (compare_val);                             \
          _asm_ _volatile_  ("lock; cmpxchgl %2, %0"              \
                          : "=m" (*(longp))                       \
                          : "0"(*(longp)), "r" (new_val),         \
                            "a" (_eax_)                           \
                          : "cc");                                \
        }
#define __dshm_did_compare_and_swap_(longp, compare_val, new_val) (\
        {                                                         \
          long _eax_ = (compare_val);                             \
          char _success_;                                         \
          _asm_ _volatile_  ("lock; cmpxchgl %3,%0 setz %1"       \
                          : "=m" (*(longp)), "=r"  (_success_)    \
                          : "0" (*(longp)), "r"   (new_val),      \
                            "a" (_eax_)                           \
                          : "cc");                                \
          _success_;                                              \
        })
#define dshm_did_ptr_compare_and_swap_(ptrp, compare_ptr, new_ptr) (\
        {                                                         \
          void * _eax_ = (compare_ptr);                           \
          char _success_;                                         \
          _asm_ _volatiie_  ("lock; cmpxchgl %3,%0; setz %1"      \
                          : "=m" (*(ptrp)), "=r"  (_success_)     \
                          : "0" (*(ptrp)), "r"    (new_ptr),      \
                            "a" (_eax_)                           \
                          : "cc");                                \
          _success_;                                              \
        })
#define __dshm_ptr_compare_and_swap_(ptrp, compare_ptr, new_ptr)  \
        {                                                         \
          void * _eax_ = (compare_ptr);                           \
          _asm_ _volatile_  ("lock; cmpxchgl %2,%0"               \
                          : "=m" (*(ptrp))                        \
                          : "0" (*(ptrp)), "r" (new_ptr),         \
                            "a" (_eax_)                           \
                          : "cc") ;                               \
        }
#define __dshm_log_base_2_(value) (                               \
        {                                                         \
          int _result_;                                           \
          _asm_     ("bsrl %1,%0"                                 \
                          : "=r" (_result_)                       \
                          : "r" (value)                           \
                          : "cc");                                \
          _result_;                                               \
        })
``` libdshm. c

This is the code that implements the libdshm functions. The file starts out with #include statements for the standard Unix header files and the internal files shown above.
INCLUDE FILES
include <assert.h>
include <dshm.h>
include <errno.h>
include <stdio.h>
include <stdlib.h>
include <sys/ipc.h>
include <sys/sysmacros.h>
include <sys/types.h>
include <unistd.h>
include "dshm_internals.h"
include "dshm asm_internals.h"
INTERNAL FUNCTIONS The internal function are called by libdshm but are not called directly by the user.
_dshm_slot_size_

Returns the number of bytes managed by a single slot.

```
/*====================================*/
size_t _dshm_slot_size_{
        size_t          buffer_size
}
{
size_t          page_size;
/*
 * Compute the slot size, which will be the greater of the system page
 * size and the buffer size.
 */
page_size = sysconf(_SC_PAGESIZE);
return MAX(page_size, buffer_size);
} /*_dshm_slot_size_*/
```

_dshm_get_slot_

The function _dshm_get_slot is called with two parameters: a dshm_handle which is merely a pointer to a _dshm_attach_data structure and a pointer to a map slot pointer. The function returns a pointer to a slot (dshm_slot data structure).

An available slot is any slot which has a reference count of zero. The actual implementation of the __dshm_get_slot function is somewhat more complex because it tries to find a slot that has not been used recently. The flow for __dshm_get_slot is shown in FIG. 13.

The __dshm_get_slot function advances the slot index and wraps around if the slot index is now greater then the size of the slot table at 1302. One could merely add one to the slot index. Using a larger value (SLOT_INDEX_ADVANCE) improves performance on multi-processor systems.

Next 1303 sets the slot pointer, slotp, from the slot array for the current node indexed by the slot index.

Block 1305 checks to see if the slot was recently used. If it was control goes to block 1304 if not control goes to block 1307.

Block 1304 checks to see if we have tried hard to find a slot that was not recently used. If we have we tried hard enough, we go to block 1306 and accept any slot with a reference count of zero. If we have not, we go to block 1310 and keep looking.

Block 1306 checks to see if the reference count is zero and if it is block 1307 sets the slot to the remapping state and block 1308 returns the slot to the caller. Blocks 1306 and 1307 perform an atomic operation so that if block 1306 finds the reference count to be zero block 1307 is performed before any other memory operations are possible. In the preferred embodiment blocks 1306 and 1307 are implemented by a single CMPXCHG instruction.

Block 1310 checks to see if we have tried hard enough to find a free slot on the current node. If we have not control flows back to 1302. If we have then control flows to 1309 which updates the node pointer to point to the next node and control goes back to 1302.

The __dshm_get_slot function assumes that there is an available slot and will loop forever if all of the slots in the map stay in use. It is assumed the user of libdshm has either used the dshm_min_mapsize function (described below) or the max_mappings value returned from the dshm_attach function. In any event, a programming error will merely result in the failure of the application but will not do any damage to the system or other users.

The dshm_map function is shown in FIGS. 14A, 14B, 14C and 14D. The function start at restart 1401 and gets a pointer to the slot where the buffer is mapped.

We check to see if there is a slot already allocated at 1403 and if there is not we go to allocate_slot 1417 to allocate a slot to use or reuse.

At 1405 we fetch and increment the use count for the slot. If the slot is currently in the remapping state we go to 1414 to set the pointer to NULL.

If the slot is not in the remapping state, 1407 checks to see if the caller established the mapping. If he did then the TLB must be coherent and 1408 returns directly to the caller.

If the caller did not establish the mapping, control flows to 1409 on FIG. 14B where we check to see if the attachment serial number (ASN) is greater than the slot serial number (SSN). If it is, then the TLB of the caller has been flushed after the mapping was established and control goes back to 1408 to return to the caller.

Note, this is the payoff of the present invention. Every time a call to dshm_map results in 1408 returning directly to the caller, there is no call to the operating system and no TLBs are invalidated.

Another advantage of this process is that "worst case" only the TLB on the current CPU is invalidated. Compare that with the prior art (for example, U.S. Pat. No. 4,733,348) where every TLB on every CPU is invalidated.

If control gets to 1410 we are definitely going to flush the TLB. Blocks 1410, 1411 and 1412 work together to update the caller's slot sequence number. Blocks 1410 and 1411 ensure that the map sequence number is newer than the slot's sequence number. This is done so that the next time the caller reuses this slot, it is sure to pass the test at 1409 and return via block 1408 without flushing any TLBs at all. Then block 1413 calls the operating system to flush the TLB and returns to the caller.

If the slot is in the remapping state, control goes to block 1414 on FIG. 14C. Block 1415 does an atomic compare and swap to set the buffer pointer to zero. It might seem strange to check the reference count at 1406 and again at 1414, however, this code is designed for use on a multi-processor without interlocks so several CPUs could be accessing the dshm_slot data structure at the same time. After 1415 sets the pointer to NULL, we decrement the use count on the slot and go back to 1401 and try again.

Finally, FIG. 14D shows the allocate_slot process. It starts at 1417 with a call to __dshm_get_slot described in detail above. Once it has a slot 1418 invalidates any buffers which are still using the slot and updates the slot's reference count. Lastly, block 1419 sets the remaining information in the dshm_slot data structure and control flows back to 1401.

```
/*
*================================================================*/
int dshm_map(
        dshm_handle_t       handle,
        unsigned long       buffer_index,
        void **             bufpp
)
{
void *              bufp;
struct dshm_slot *  slotp;
long                refcnt;
dshm_sn_t *         msnp;
dshm_sn_t           asn_snapshot;
dshm_sn_t           msn_snapshot;
dshm_sn_t           ssn_snapshot;
void **             sbufpp;
void *              temp_bufp;
int                 shift;
int                 mask;
restart:
```

```
        /*
         * Use the value of *bufpp to look up the map slot (if any) where the
         *buffer is mapped.
         */
        bufp = *bufpp;
        if (bufp = = NULL)
            {
               goto allocate_slot;
            }
        /*
         * According to our snapshot of the buffer pointer, the buffer is
         * mapped. Now to make it stay that way . . .
         *
         * Atomically increment the slot reference count.
         * If the slot still maps the buffer (and no remap is in progress),
         * we will use this mapping.
         */
        slotp = BUFP_TO_SLOTP(handle, bufp);
        refcnt = _dshm_fetch_and_increment_(&slotp->slot_refcnt);
        if (bufp = = *bufpp)
            {
if (refcnt >= 0)
    {
    /*
     * Return immediately if the caller's TLB is coherent for the
     * slot. The TLB is coherent if the caller itself established
     * the mapping, or if the caller has flushed its TLB for the
     * map since the current mapping was established.
     *
     * First check to see if the caller established the mapping.
     */
    if (handle->attach_pid = = slot_pid)
    {
    return 0;
    }
    /*
     * Checking whether the caller has flushed its TLB since the
     * mapping was established is performed by comparing timestamps
     * (sequence numbers) associated with those events.
     *
     * However, we first have to ensure that the caller's TLB flush
     * sequence number does not appear to be impossibiy new due to
     * a wraparound condition. If the caller's sequence number is
     * valid and newer than the slot's, the caller's TLB is
     * coherent for the mapping.
     */
    msnp = handle->attach_msnp;
    asn_snapshot = handle ->attach_sn;
    ssn_snapshot = slotp->slot_sn;
    msn_snapshot = *msnp;
    if (SN_IS_VALID(asn_snapshot, msn_snapshot) &&
         SN_IS_NEWER(asn_snapshot, ssn_snapshot))
    {
    return 0;
    }
    /*
     * Neither of the simple tests for coherency succeeded, so
     * We're probabiy going to flush the TLB.
     *
     * First ensure that we didn't fail due to wraparound effects
     * on the slot sequence number.
     */
    if (! SN_IS_VALID(ssn_snapshot, msn_snapshot))
         {
    /*
     * The slot sequence number is so old it's invalid.
     * Update it to a valid, more recent value.
     * If caller's sequence number was valid (implying that it
     * was newer than the slot's), return.
     */
    slotp->slot_sn = GET_VALID_SN(*msnp);
    if (SN_IS_VALID(asn_snapshot, msn_snapshot))
         {
             return 0;
         }
    }
    /*
     * Now we're definitely going to update the caller's sequence
     * number and flush its TLB.
     *
```

```
         * Ensure that the map's sequence number is newer than the
         * slot's sequence number. This is done so that next time the
         * caller reuses this slot, it's sure to pass the sequence
         * number coherency test.
         */
        if (SN_IS_EQUAL(ssn_snapshot, msn_snapshot))
            {
            (void)_dshm_fetch_and_increment_(msnp);
            }
        /*
         * Update the caller's sequence number from the current (map)
         * sequence number, invalidate the TLB, and return. These steps
         * must be performed in this order to ensure that the TLB
         * contents are newer than the caller's sequence number.
         */
        handle->attach_sn = *msnp;
        _invlpg_(0,0);
        return 0;
        }
    else /* refcnt < 0 */
        {
        /*
         * The buffer pointer still references this slot, but the
         * slot's reference count was negative, indicating that the
         * slot is being remapped.
         *
         * Use an atomic compare&swap to reset the buffer pointer to
         * NULL. The process which is remapping the slot should set it
         * to NULL, but there's a possibility of a time lag or abnormal
         * process termination. If the compare fails, someone else
         * invalidated the pointer before we could; that's fine.
         *
         * Before we do all this, however, we load the reference count
         * again to ensure that there's still a remap in progress.
         * This proves that bufpp is the old slot target being replaced
         * by the remapping operation, not the new target for the slot.
         * In the very unlikely event that bufpp were the new target,
         * we could not safely change *bufpp to NULL. (bufpp could be
         * the new target only if the slot were recycled from bufpp to
         * another buffer and back to bufpp between the two times we
         * loaded *bufpp! Nontheless, we protect against this
         * possibility.)
         */
        if (slotp->slot_refcnt < 0)
            {
            _dshm_ptr_compare_and_swap_(bufpp, bufp, NULL);
            }
        }
    }
/*
     * The buffer pointer no longer references this slot.
     * Decrement the slot's reference count.
     *
     * Although chances are good that noone has yet remapped the buffer
     * to a new slot, we go back and start over. We cannot loop in the
     * above code infinitely unless mappings for our buffer keep getting
     * created and destroyed by other processes at a furious rate.
     *
     * It would also be correct to simply fall into the code below, but
     * it seems worth a quick check of *bufpp before we pay for a new slot.
     */
    refcnt = _dshm_fetch_and_decrement_(&slotp->slot_refcnt);
    goto restart;
allocate_slot:
    /*
     * *bufpp is NULL, so the buffer is not mapped.
     *
     * Call _dshm_get_slot_ to find a slot to reuse, and put it into the
     * remapping state so that its current mapping cannot be used.
     * The remapping state is entered by atomically changing the slot's
     * reference count from 0 to REMAPPING_REFCNT, a large negative value.
     */
    slotp = _dshm_get_slot_(handle, &bufp);
    /*
     * THE FOLLOWING CODE IS VERY SIMILAR TO CODE IN dshm_umap.
     * IF ONE IS CHANGED THE OTHER LIKELY NEEDS MODIFICATION AS WELL.
     *
     * Invalidate any buffer pointer which is using the slot.
     * Once this is done, atomically add (1 - REMAPPING_REFCNT) to the
     * slot's reference count to change it from the remapping state to a
```

```
 * positive map count. The caller's net change to the count will then
 * be +1.
 */
sbufpp = slotp->slot_bufpp;
if (sbufpp = = NULL)
        {
        /*
         * The slot maps no buffer. Just update the refcnt.
         */
        refcnt = __dshm_fetch_and_add_(&slotp->slot_refcnt,
                        1 - REMAPPING_REFCNT);
        }
else
        {
        if (? _dshm_did_ptr_compare_and_swap_(sbufpp, bufp, NULL))
                {
                temp_bufp = *sbufpp;
                if (BUFPS_ARE_IN_SAME_SLOT(temp_bufp, bufp, handle))
                        {
                        _dshm_ptr_compare_and_swap_(sbufpp, temp_bufp, NULL);
                        }
                }
        refcnt = __dshm_fetch_and_add_(&slotp->slot_refcnt,
                        1 - REMAPPING_REFCNT);
        slot->slot_bufpp = NULL;
        if (sbufpp = = bufpp)
                {
                if (handle->attach_force_unmap)
                        {
                        _dshm_remap_(handle->attach_dshmid, bufp, -1);
                        }
                refcnt = __dshm_fetch_and_decrement_(&slotp->slot_refcnt);
                goto restart;
                }
        }
/*
 * END OF CODE SIMILAR TO dshm_unmap CODE.
 */
_dshm_remap_(handle->attach_dshmid, bufp, buffer_index);
slotp->slot_sn = *handle->attach_msnp;
slotp->slot_pid = handle->attach_pid;
shift = handle->attach_bufsize_shift;
mask = handle->attach_slotsize_mask;
bufp = (char *)bufp + ((buffer index << shift) & mask);
if (! _dshm_did_ptr_compare_and_swap_(bufpp, NULL, bufp))
        {
        refcnt = __dshm_fetch_and_decrement_(&slotp->slot_refcnt);
        goto restart;
        }
slotp->slot_bufpp = bufpp;
return 0;
} /* dshm_map */
dshm_unmap
Unmap Buffer
        int             dshm_unmap(
                        dshm_handle_t   handle,
                        const void*     bufp);
    Description
        dshm_unmap releases a mapping to allow map
        slot reassignment as needed.
    Return Value
        -1              An error occurred. errno is set to
                        identify the error.
        0               The operation succeeded.
/*================================================================*/
int dshm_unmap(
        dshm_handle_t   handle,
        const void *    bufp
)
(
struct dshm_slot *      slotp;
long                    refcnt;
void **                 sbufpp;
void *                  temp_bufp;
/*
 * Use bufp to look up the map slot where the buffer is mapped.
 */
slotp = BUFP_TO_SLOTP(handle, bufp);
/*
 * Mark the slot recently used and decrement its reference count.
```

```
*/
slotp->slot_was_recently_used = DSHM TRUE;
refcnt = __dshm_fetch_and_decrement_(&slotp->slot_refcnt);
/*
 * Return if DSHM_FORCE_UNMAP is not in effect.
 */
if (!handle->attach_force_unmap)
    {
    return 0;
    }
/*
 * The map was created the DSHM_FORCE_UNMAP option, which requests
 * that DSHM aggressively invalidate mappings which are not in use.
 *
 * If the reference count was greater than 1, return. The slot has
 * additionai mappings outstanding.
 */
if (refcnt > 1)
    {
    return 0;
    }
/*
 * Attempt to atomically change the slot's reference count from 0
 * to REMAPPING_REFCNT.
 */
if (?__dshm_did_compare_and_swap_(&slotp->slot_refcnt,
                0,
                REMAPPING_REFCNT))
    {
    /*
     * The reference count was non-zero, meaning that a new mapping
     * was just created or another process has just claimed the
     * slot for replacement. Return.
     */
    return 0;
    }
/*
 * THE FOLLOWING CODE IS VERY SIMILAR TO CODE IN dshm_map.
 * IF ONE IS CHANGED THE OTHER LIKELY NEEDS MODIFICATION AS WELL.
 *
 * Invaildate any buffer pointer which is using the slot.
 *
 * Because we decremented the slot's reference count to zero, another
 * process could have come and reused the slot before we put it in the
 * remapping state.
 */
sbufpp = slotp->slot_bufpp;
if (sbufpp = = NULL)
    {
    /*
     * The slot maps no buffer. Just update the refcnt.
     */
    refcnt = __dshm_fetch_and_add_(&slotp->slot_refcnt,
                - REMAPPING_REFCNT);
    }
else
    {
    if (?__dshm_did_ptr_compare_and_swap_(sbufpp, (void *)bufp, NULL))
        {
        temp_bufp = *sbufpp;
        if (BUFPS_ARE_IN_SAME_SLOT(temp_bufp, bufp, handle))
            {
            __dshm_ptr_compare_and_swap_(sbufpp, temp_bufp, NULL);
            }
        }
    }
/*
 * Atomically add (1 - REMAPPING_REFCNT) to the slot's
 * reference count to change it from the remapping state to a
 * positive map count. The caller's net change to the count
 * will then be 0.
 *
 * We could postpone this change, leaving the slot in the
 * remapping state until we've invalidated the slot's buffer
 * pointer pointer and called __dshm_remap_. We do it this
 * way to stay as close as possibie to the dshm_map code
 * above.
 */
refcnt = __dshm_fetch_and_add_(&slotp->slot_refcnt,
            1 - REMAPPING_REFCNT);
slotp->slot_bufpp = NULL;
```

```
        __dshm__remap__(handle->attach__dshmid, bufp, -1);
        refcnt = __dshm__fetch__and__decrement__(&slotp->slot__refcnt);
)
/*
 * END OF CODE SIMILAR TO dshm__map CODE.
 *
 return 0;
}__unmap */
dshm__detach
Detach Segment
        int             dshm__detach(
                        dshm__handle__t     handle);
    Description
        dshm—detach disconnects the specified segment
        from the caller's address space.
    Return Value
        -1              An error occurred. errno is set to
                        identify the error.
        0               The operation succeeded.
/*====================================================================*/
int dshm__detach(
    dshm__handle__t     handle
)
{
ulong__t                map__addr;
ulong__t                addr;
map__addr = (ulong__t)handle->attach__map__addr;
for (addr = map__addr;
     addr < map__addr + handle->attach__map__size;
     addr += DSHM_MINALIGNMENT)
     {
     __dshm__slot__lookup__[addr >> DSHM_MINALIGNMENT_SHIFT] = NULL;
     }
free(handle);
return __dshmdt__((char *)map__addr);
} /* dshm__detach */
```

Although the description above contains many specificities, these should not be construed as limiting the scope of the invention but as merely providing illustrations of some of the presently preferred embodiments of this invention. Various other embodiments and ramifications are possible within its scope.

For example, this specification shows multiple processes operating under the Unix operating system, however, it is straight forward to implement the claimed invention using tasks under the Windows NT operating system.

Thus the scope of the invention should be determined by the appended claims and their legal equivalents, rather than by the examples given.

What is claimed is:

1. A method for increasing the performance of a multi-processor system executing a plurality of user tasks having:
   (a) a plurality of processors each one of said processor having a translation lookaside buffer (TLB) for caching translations between virtual and physical addresses;
   (b) said each one of said processors also having at least one user mode for executing applications and at least one kernel mode for performing operating system functions;
   (c) a data object larger than the address space of at least one of said plurality of user tasks;
   (d) a mapping table having a plurality of slots and shared by at least two of said user tasks and each of said slots being in either one of a plurality of mapped states, the unmapped state or the remapping state;
   (e) a plurality of buffers each one of said buffers being a piece of said large data object and capable of being shared by at least two of said user tasks;
   (f) a plurality of shared pointers each associated with a piece of said large data object and either null, or non-null and mapped via said mapping table to one of said buffers;

said method comprising responding to a call to a library function to map a selected one of said shared pointers to its corresponding shared buffer by:
   (I) checking to see if said selected shared pointer is null and if it is null performing the following substeps:
      (i) locating an available slot in said mapping table;
      (ii) placing said available slot into the remapping state;
      (iii) invalidating any buffer pointer which is using said available slot;
      (iv) placing said available slot into the mapped state;
      (v) invalidating any TLB entries on the executing CPU corresponding to said available slot;
      (vi) setting said selected shared pointer to point to said slot; and
      (vii) returning to the caller of said library function;
   (II) obtaining a selected one of said slots associated with said selected shared pointer;
   (III) performing substeps (i) to (vii) of step (I) if said slot is in the remapping state;
   (IV) determining, completely in one of said user modes, if any TLB entries need to be flushed and returning directly to the caller if no TLB flush is required;
   (V) entering one of said kernel modes and flushing said TLB entries if step (IV) determined that a flush was required.

2. The method of claim 1, where said determining step (IV) comprises comparing the time of the most recent TLB flush with the time said selected slot was placed into the mapped state.

3. The method of claim 1, where said determining step (IV) comprises:
   (I) comparing a first sequence number associated with said selected slot with a second sequence number associated with the currently executing task;

(II) determining that no TLB flush is required if said second sequence number is greater than said first sequence number;

(III) determining that a TLB flush is required if said second sequence number is not greater than said first sequence number;

(IV) if a TLB flush is required and if said first sequence number is equal to a third sequence number associated with said mapping table, incrementing said third sequence number associated with said mapping table;

(V) if a TLB flush is required setting said second sequence number equal to said third sequence number.

4. The method of claim 1, where:

(a) each said slot has a task identifier which uniquely identifies one of said plurality of user task;

(b) said checking step (I) also comprises storing the task identifier for the current task into said available slot; and (c) said determining step (IV) also comprises comparing the task identifier for the current task with the task identifier stored in said slot and returning directly to the caller if they are equal.

5. A computer system for performing database operations comprising:

(a) a plurality of processors each processor having a translation lookaside buffer (TLB) for caching translations between virtual and physical addresses;

(b) each of said processors also having at least one user mode for executing applications and at least one kernel mode for performing operating system functions;

(c) a plurality of user tasks;

(d) a data object larger than the address space of at least one of said user tasks;

(e) a mapping table having a plurality of slots and shared by at least two of said user tasks and each of said slots being in either one of a plurality of mapped states, the unmapped state or the remapping state;

(f) a plurality of buffers each buffer being a piece of said large data object and each buffer being capable of being shared by at least two of said user tasks;

(g) a plurality of shared pointers each associated with a piece of said large data object and either null, or non-null and mapped via said mapping table to one of said buffers;

(h) means for responding to a call to a library function to map a selected one of said shared pointers to its corresponding shared buffer by determining, completely in one of said user modes, if any TLB needs to be flushed and returning directly to the caller if no TLB flush is required.

6. A computer system for performing database operations comprising:

(a) a plurality of processors each processor having a translation lookaside buffer (TLB) for caching translations between virtual and physical addresses;

(b) each of said processors also having at least one user mode for executing applications and at least one kernel mode for performing operating system functions;

(c) a plurality of user tasks;

(d) a data object larger than the address space of at least one of said user tasks;

(e) a mapping table having a plurality of slots and shared by at least two of said user tasks and each of said slots being in either one of a plurality of mapped states, the unmapped state or the remapping state;

(f) a plurality of buffers each buffer being a piece of said large data object and each buffer being capable of being shared by at least two of said user tasks;

(g) a plurality of shared pointers each associated with a piece of said large data object and either null, or non-null and mapped via said mapping table to one of said buffers;

(h) a means for responding to a call to a library function to map a selected one of said shared pointers to its corresponding shared buffer;

(i) a means for determining, completely in one of said user modes, if any TLB needs to be flushed and returning directly to the caller if no TLB flush is required.

7. The computer system of claim 6, additionally comprising:

(j) a shared physical memory larger that the address space of at least one of said tasks;

(k) a means for creating a shared segment in said shared physical memory;

(l) a means for creating a shared map in said shared physical memory.

8. The computer system of claim 7, additionally comprising:

(m) a means for attaching said shared map to the address space of at least two of said tasks.

9. The computer system of claim 6 additionally comprising:

(a) means for obtaining a selected one of said slots associated with said selected shared pointer;

and where said determining means (i) additionally comprises:

(I) means for comparing a first sequence number associated with said selected slot with a second sequence number associated with the currently executing one of said tasks;

(II) means for determining that no TLB flush is required if said second sequence number is greater than said first sequence number;

(III) means for determining that a TLB flush is required if said second sequence number is not greater than said first sequence number;

(IV) means for incrementing a single third sequence number associated with said mapping table if a TLB flush is required and if said first sequence number is equal to said third sequence number;

(V) means for setting said second sequence number to the value of said third sequence number if a TLB flush is required.

* * * * *